US011305417B2

(12) United States Patent
Luo et al.

(10) Patent No.: US 11,305,417 B2
(45) Date of Patent: Apr. 19, 2022

(54) SERVICE ROBOT

(71) Applicant: BAIDU ONLINE NETWORK TECHNOLOGY (BEIJING) CO., LTD., Beijing (CN)

(72) Inventors: Bingkang Luo, Beijing (CN); Shiyan Li, Beijing (CN); Daisong Guan, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 169 days.

(21) Appl. No.: 16/810,079

(22) Filed: Mar. 5, 2020

(65) Prior Publication Data

US 2020/0406448 A1 Dec. 31, 2020

(30) Foreign Application Priority Data

Jun. 28, 2019 (CN) .......................... 201910580062.7
Jun. 28, 2019 (CN) .......................... 201921005888.2

(51) Int. Cl.
  *B25J 9/00* (2006.01)
  *B25J 5/00* (2006.01)
  *B25J 11/00* (2006.01)
  *G05D 1/02* (2020.01)

(52) U.S. Cl.
  CPC ............. *B25J 9/0003* (2013.01); *B25J 5/007* (2013.01); *B25J 9/0009* (2013.01); *B25J 11/008* (2013.01); *G05D 1/024* (2013.01); *G05D 2201/0207* (2013.01)

(58) Field of Classification Search
  CPC ........ B25J 9/0003; B25J 9/0009; B25J 5/007; B25J 11/008; B05D 1/024; G05D 2201/0207
  See application file for complete search history.

(56) References Cited

U.S. PATENT DOCUMENTS

| 9,193,402 | B2 * | 11/2015 | Chin ......................... B25J 5/00 |
| 9,427,123 | B2 * | 8/2016 | Vanderstegen-Drake ................... A47L 9/04 |
| 9,662,795 | B2 | 5/2017 | Yamaguchi |
| 10,070,763 | B2 | 9/2018 | Won et al. |

(Continued)

FOREIGN PATENT DOCUMENTS

| CN | 108000530 A | 5/2018 |
| CN | 108972590 A | 12/2018 |
| WO | 2017/120180 A1 | 7/2017 |

OTHER PUBLICATIONS

Staab et al., A Robotic Parallel Platform for Automated Tire Changing of Large Mining Vehicles, 2014, IEEE, p. 435-441 (Year: 2014).*

(Continued)

*Primary Examiner* — McDieunel Marc
(74) *Attorney, Agent, or Firm* — Fay Sharpe LLP (57) ABSTRACT

A service robot includes a robot main body, a robot housing and a shielding structure. The robot main body is arranged in the robot housing, and the robot housing is fixed on the robot main body by means of a fastener. The shielding structure is fit on the robot housing to block the fastener. The service robot blocks the fastener exposed outside the robot housing by means of the shielding structure, so as to effectively improve the aesthetics and integrity of the overall appearance of the service robot.

17 Claims, 4 Drawing Sheets

(56) References Cited

U.S. PATENT DOCUMENTS

| | | | |
|---|---|---|---|
| 2008/0133052 A1* | 6/2008 | Jones | G05D 1/0088 |
| | | | 700/245 |
| 2013/0087393 A1* | 4/2013 | Vanderstegen-Drake | |
| | | | B60L 50/52 |
| | | | 180/9.1 |
| 2015/0148949 A1* | 5/2015 | Chin | B05D 1/02 |
| | | | 700/245 |
| 2016/0338262 A1* | 11/2016 | Liu | B08B 13/00 |
| 2020/0023513 A1* | 1/2020 | Ha | B25J 5/007 |
| 2020/0030707 A1* | 1/2020 | Hayashi | A63H 9/00 |
| 2020/0206895 A1* | 7/2020 | Jung | B62D 61/10 |
| 2020/0206902 A1* | 7/2020 | Jung | B25J 5/007 |

OTHER PUBLICATIONS

Seneci et al., Design of a smart 3D-printed wristed robotic surgical instrument with embedded force sensing and modularity, 2016, IEEE, p. 3677-3683 (Year: 2016).*

Duan et al., Control system design and implementation for a blocking plate manipulation robot, 2013, IEEE, p. 1503-1507 (Year: 2013).*

Menon et al., Design of a semi-passive heavy-duty mobile robotic system for automated assembly inside an aircraft body, 2008, IEEE, p. 2429-2434 (Year: 2008).*

Office Action for corresponding EP application No. 20162876.5, dated Oct. 5, 2020, 9 pages.

* cited by examiner

SERVICE ROBOT

CROSS-REFERENCE TO RELATED APPLICATION

This application claims priority to and benefits of Chinese Patent Application Serial No. 201921005888.2, filed with National Intellectual Property Administration of PRC on Jun. 28, 2019, and Chinese Patent Application Serial No. 201910580062.7, filed with National Intellectual Property Administration of PRC on Jun. 28, 2019, the entire contents of which are incorporated herein by reference.

FIELD

The present disclosure relates to a technical field of robots, and more particularly to a service robot.

BACKGROUND

Traditional service robots adopt an installation form that a fastener passes through a robot housing from the outside and fastens the robot housing on a robot main body, causing a part of the fastener to be exposed outside the robot housing, which may be intuitively observed by external people, thus reducing the beauty and integrity of the overall appearance of the service robot, which has room for improvement.

SUMMARY

The present disclosure intends to solve at least one of the above technical problems in related art to a certain extent. Therefore, the present disclosure proposes a service robot, which blocks fasteners exposed outside a robot housing by means of a shielding structure, so as to effectively improve the aesthetics and integrity of the overall appearance of the service robot.

The service robot according to an embodiment of the present disclosure includes: a service robot, including: a robot housing, the robot main body being arranged in the robot housing, and the robot housing being configured to be fixed on the robot main body by means of a fastener; a shielding structure being configured to be fit on the robot housing to block the fastener.

The service robot according to embodiments of the present disclosure shields the fastener exposed outside the robot housing by means of the shielding structure, thereby effectively improving the aesthetics and integrity of the overall appearance of the service robot.

Additionally, the service robot according to embodiments of the present disclosure can have the additional technical features as follows.

In some embodiments of the present disclosure, the shielding structure includes: a first shielding member. The robot housing has a groove recessed inwardly, and the fastener is configured to pass through the groove to be fastened with the robot main body. The first shielding member is configured to be fitted with the groove to shield the fastener in the groove.

In some embodiments of the present disclosure, the first shielding member is configured to be fixed in the groove by snap-fitting.

In some embodiments of the present disclosure, after the first shielding member is fitted in the groove, an outer surface of the first shielding member is flush with an outer surface of the robot main body.

In some embodiments of the present disclosure, the groove is configured as a long groove and allows a plurality of fasteners to pass and be fastened at the same time, the first shielding member has a long strip structure, and the first shielding member of the long strip structure is closely fitted with the long groove to shield the fasteners in the long groove.

In some embodiments of the present disclosure, the robot housing includes a front housing and a rear housing, one of the front housing and the rear housing has a snap, while the other one thereof has a snap slot, and when the snap is fitted in the snap slot, the front housing and the rear housing are fixed together.

In some embodiments of the present disclosure, each of the front housing and the rear housing is provided with the groove recessed inwardly.

In some embodiments of the present disclosure, the rear housing includes a rear upper housing and a rear lower housing, the groove of the rear housing is formed in the rear lower housing, and the fastener is configured to pass through the groove to be fastened with a base of the robot main body.

In some embodiments of the present disclosure, the shielding structure includes a second shielding member. The robot housing has a display through-hole, and the service robot also has a front display that faces directly the display through-hole. An inner wall of the display through-hole is connected with a fixed edge extending to the inside of the robot housing. The fixed edge is configured to be fastened with the robot main body by means of the fastener, and the second shielding member is configured to be fitted with the display through-hole to shield the fixed edge and the fastener.

In some embodiments of the present disclosure, the second shielding member is configured to be snap-fitted with the display through-hole.

In some embodiments of the present disclosure, the second shielding member has an annular structure to avoid shielding the front display.

In some embodiments of the present disclosure, the color of the shielding structure and the color of the robot housing are the same, and the shielding structure is a flexible structure.

In some embodiments of the present disclosure, an inner wall surface of at least one of the front housing and the rear housing is provided with fastening studs with internal threads, a plurality of fastening plates extend from the robot main body, and the fastening studs and the fastening plates are configured to be fastened together by means of fastening bolts.

In some embodiments of the present disclosure, the fastening stud is of a blind-hole structure with internal threads.

In some embodiments of the present disclosure, the robot main body includes a robot skeleton, a motion mechanism, a control mechanism and a drive mechanism. The motion mechanism is arranged below the robot skeleton, and the drive mechanism and the control mechanism are arranged on the robot skeleton. The control mechanism is configured to control the drive mechanism to drive the motion mechanism to move.

In some embodiments of the present disclosure, the motion mechanism includes a plurality of rollers.

In some embodiments of the present disclosure, the robot housing is provided with a SLAM sensor, an obstacle avoidance sensor and a vision sensor.

In some embodiments of the present disclosure, the robot main body includes a robot head driving portion and a robot arm driving portion. The robot head driving portion is arranged on top of the robot skeleton, and the robot arm driving portion is arranged on both sides of the robot skeleton. The robot head is configured to pass through the robot housing so as to be connected with the robot head driving portion, and the robot arm is configured to pass through the robot housing so as to be connected with the robot arm driving portion.

REFERENCE NUMERALS service robot 100, robot main body 1, robot housing 2, shielding structure 3, first shielding member 31, groove 21, second shielding member 32, display through-hole 22, fixed edge 23, front display 4, robot skeleton 11, motion mechanism 12, fastening plate 13, robot head driving portion 15, robot arm driving portion 16, robot head 5, robot arm 6, front housing 24, rear housing 25, rear upper housing 251, rear lower housing 252, fastening stud 26.

DETAILED DESCRIPTION

Embodiments of the present disclosure are further described. Examples of the embodiments are illustrated in the accompanying drawings. The same or similar elements and the elements having same or similar functions are denoted by like reference numerals throughout the descriptions. The embodiments described below with reference to the accompanying drawings are exemplary, are intended to be used to explain the present disclosure, and cannot be construed as limitation to the present disclosure.

In the specification of the present disclosure, it is to be understood that, terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" indicate the orientation or position relationship based on the orientation or position relationship illustrated in the drawings only for convenience of description or for simplifying description of the present disclosure, and do not alone indicate or imply that the device or element referred to must have a particular orientation or be constructed and operated in a specific orientation, and hence cannot be construed as limitation to the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, the term "a plurality of" means at least two, such as two, three and so on, unless specified otherwise.

In the present disclosure, unless specified otherwise, terms "mounted," "coupled," "connected," "fixed" and the like are used broadly. For example, fixed connections, detachable connections, or integral connections; may also be mechanical or electrical connections or communication connections; may also be direct connections or indirect connections via intervening structures; may also be inner communications or interactions of two elements, which may be understood by those skilled in the related art according to specific situations.

In the descriptions of the present disclosure, unless otherwise expressly specified and limited, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

A service robot 100 according to an embodiment of the present disclosure will be described below with reference to FIGS. 1-4.

The service robot 100 according to the embodiment of the present disclosure may include a robot main body 1, a robot housing 2 and a shielding structure 3.

As illustrated in FIGS. 1-4, the robot main body 1 is arranged in the robot housing 2, and the robot housing 2 is used to protect the robot main body 1 and improve an overall aesthetic appearance of the service robot 100. The robot housing 2 is configured to be fixed on the robot main body 1 by means of a fastener, so as to stably arrange the robot housing 2 on the robot main body 1, thereby ensuring the overall stability of the service robot 100.

The fastener may be a fastening bolt, which is more convenient to fasten and mount.

Since the traditional service robots adopt an installation form that a fastener passes through a robot housing from the outside and fastens the robot housing on a robot main body, causing a part of the fastener to be exposed outside the robot housing, which may be intuitively observed by external people, thus reducing the aesthetics and integrity of the overall appearance of the service robot.

Therefore, the embodiment of the present disclosure is provided with the shielding structure 3. The shielding structure 3 is configured to be fit on the robot housing 2 to block the fastener. As the fastener is blocked by the shielding structure 3 arranged on the robot housing 2, the exposed fastener will not be observed by external people, and the aesthetics and integrity of the overall appearance of the service robot 100 will be improved effectively.

The service robot 100 according to the embodiments of the present disclosure blocks the fastener exposed outside the robot housing 2 by means of the shielding structure 3, so as to effectively improve the aesthetics and integrity of the overall appearance of the service robot 100.

As illustrated in FIGS. 1-4, the shielding structure 3 includes: a first shielding member 31. The robot housing 2 includes: a front housing 24 and a rear housing 25. The front housing 24 and the rear housing 25 are engaged, and assembled in the form of snap-fit fixation to form a complete robot housing 2. For example, one of the front housing 24 and the rear housing 25 has a snap, while the other one thereof has a snap slot fitted with the snap. When the snap is fitted in the snap slot, the front housing 24 and the rear housing 25 are stably fixed together. Therefore, by the snap-fit fixation of the front housing 24 and the rear housing 25, the number of fasteners used additionally to the service robot 100 may be effectively decreased, thereby further effectively reducing the overall weight of the service robot 100 and ensuring the aesthetics and integrity of the overall appearance of the service robot 100.

Both of the front housing 24 and the rear housing 25 are provided with grooves 21 recessed inwardly to the inside of the robot housing 2 (towards the robot main body 1), and the rear housing 25 also includes: a rear upper housing 251 and a rear lower housing 252. The groove 21 of the rear housing 25 is formed on the rear lower housing 252, and the fastener is configured to pass through the groove 21 to be fastened with a base of the robot main body 1. When the fastener is exemplified as a fastening bolt, a rod portion of the fastening bolt will pass through a bottom wall of the groove 21 and be fastened with the base of the robot main body 1, while a head portion of the fastening bolt will stay in the groove 21 to be exposed outside the robot housing 2. However, the first shielding member 31 is configured to cooperate with the groove 21 to shield the fastener (the head portion of the fastening bolt) in the groove 21, such that external people cannot observe the exposed fastener from outside, thereby effectively improving the aesthetics and integrity of the overall appearance of the service robot 100.

In some embodiments of the present disclosure, the first shielding member 31 may be of a long strip structure (refer to FIG. 2 and FIG. 4), and the groove 21 may be a long groove 21, such that the groove 21 can allow a plurality of fasteners to pass and be fastened at the same time. The first shielding member 31 in the long strip shape may also be closely fitted with the long groove 21 to shield the fasteners in the long groove 21.

According to some embodiments of the present disclosure, the first shielding member 31 is configured to be snap-fitted in the groove 21. As a result, the mounting becomes convenient, and no separate fastener needs to be provided to fasten the first shielding member 31 and the groove 21, which may effectively save the mounting time.

According to some embodiments of the present disclosure, after the first shielding member 31 is fitted in the groove 21, an outer surface of the first shielding member 31 is flush with an outer surface of the robot main body 1. Therefore, the robot housing 2 will not appear uneven due to the mounting of the first shielding member 31 on the robot housing 2, which may further improve the aesthetics and integrity of the overall appearance of the robot housing 2.

As illustrated in FIGS. 1-4, the shielding structure 3 includes a second shielding member 32. The robot housing 2 has a display through-hole 22. The service robot 100 also has a front display 4, and the front display 4 faces directly the display through-hole 22, such that external person may observe the front display 4 by means of the display through-hole 22. An inner wall of the display through-hole 22 is connected with a fixed edge 23 extending to the inside of the robot housing 2. The fixed edge 23 is configured to be fastened with the robot main body 1 by means of the fastener, so as to allow the robot housing 2 to be fastened to the robot main body 1. The second shielding member 32 is configured to cooperate with the display through-hole 22 to shield the fixed edge 23 and the fastener, such that external people cannot observe the fastener, thereby effectively improving the aesthetics and integrity of the overall appearance of the service robot 100.

Figure 2:
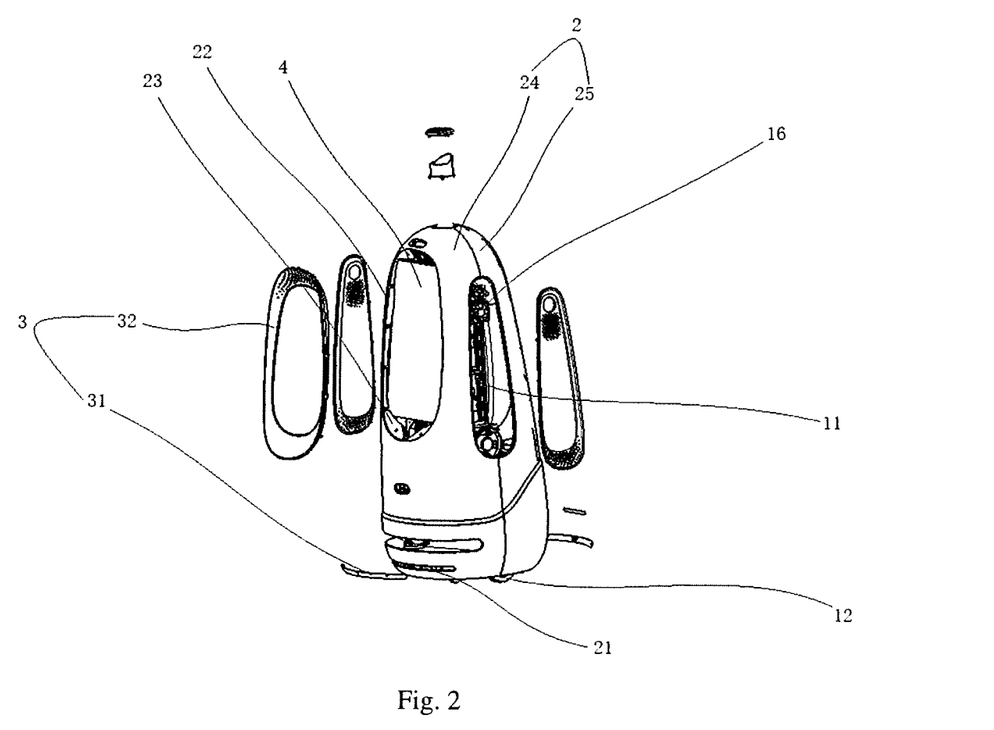
FIG. 2 is an exploded view of a service robot according to an embodiment of the present disclosure.
Figure 4:
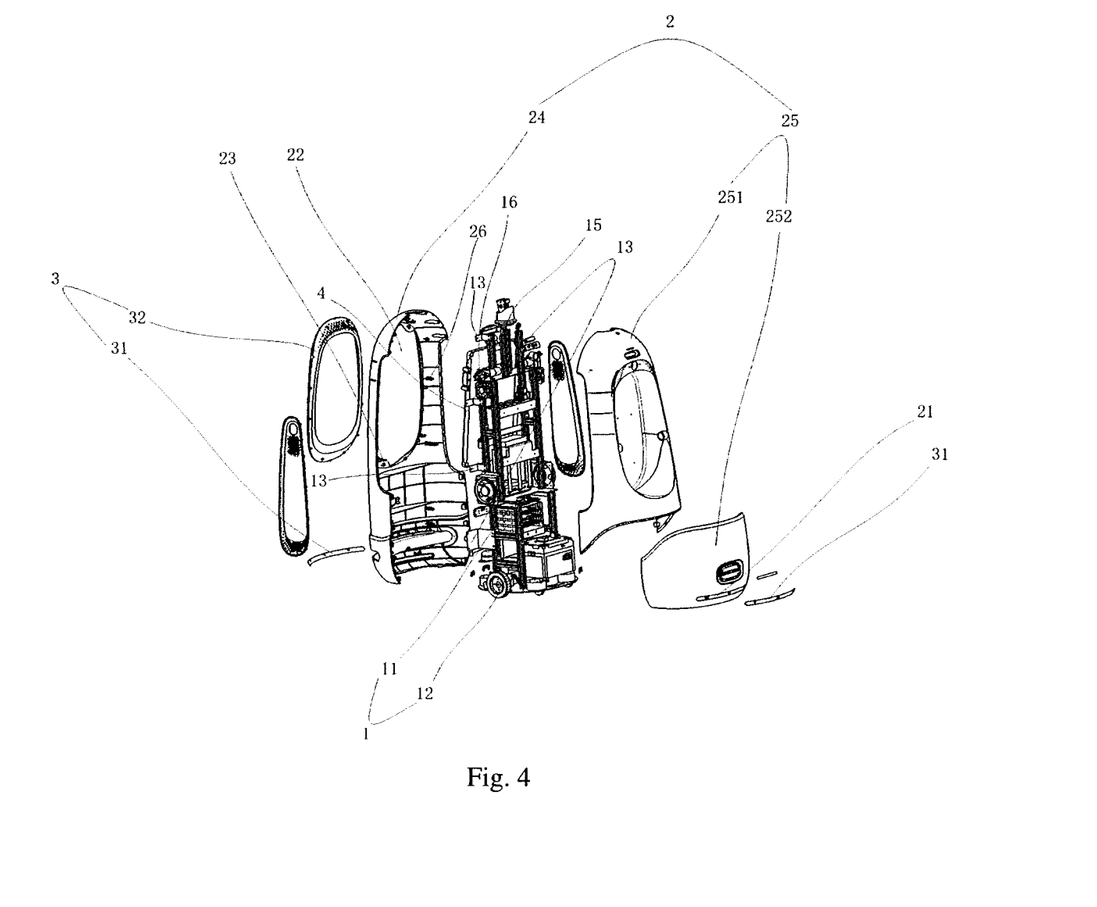
FIG. 4 is an exploded view of a service robot according to an embodiment of the present disclosure.

In some embodiments of the present disclosure, the second shielding member 32 may be of an annular structure (refer to FIGS. 2 and 4). Thus, the second shielding member 32 may be fitted with the display through-hole 22 better and more compactly, and the front display 4 may be revealed from a through-hole in the second shielding member 32 to avoid shielding the front display 4.

According to some embodiments of the present disclosure, the second shielding member 32 is configured to be snap-fitted with the display through-hole 22. Thus, the mounting becomes convenient, and it is not necessary to arrange a separate fastener to fasten the second shielding member 32 and the display through-hole 22, which may effectively save the mounting time.

According to some embodiments of the present disclosure, the color of the shielding structure 3 is the same as that of the robot housing 2. Thus, the appearance color of the robot housing 2 mounted with the shielding structure 3 can keep consistent, and will not appear abrupt, thereby further effectively improving the aesthetics and integrity of the overall appearance of the robot housing 2.

According to some embodiments of the present disclosure, the shielding structure 3 is a flexible structure, which is more convenient to mount. Compared with a rigid structure, the flexible structure can be fit on the robot housing 2 better and more closely to ensure the integrity of the robot housing 2.

Figure 1:
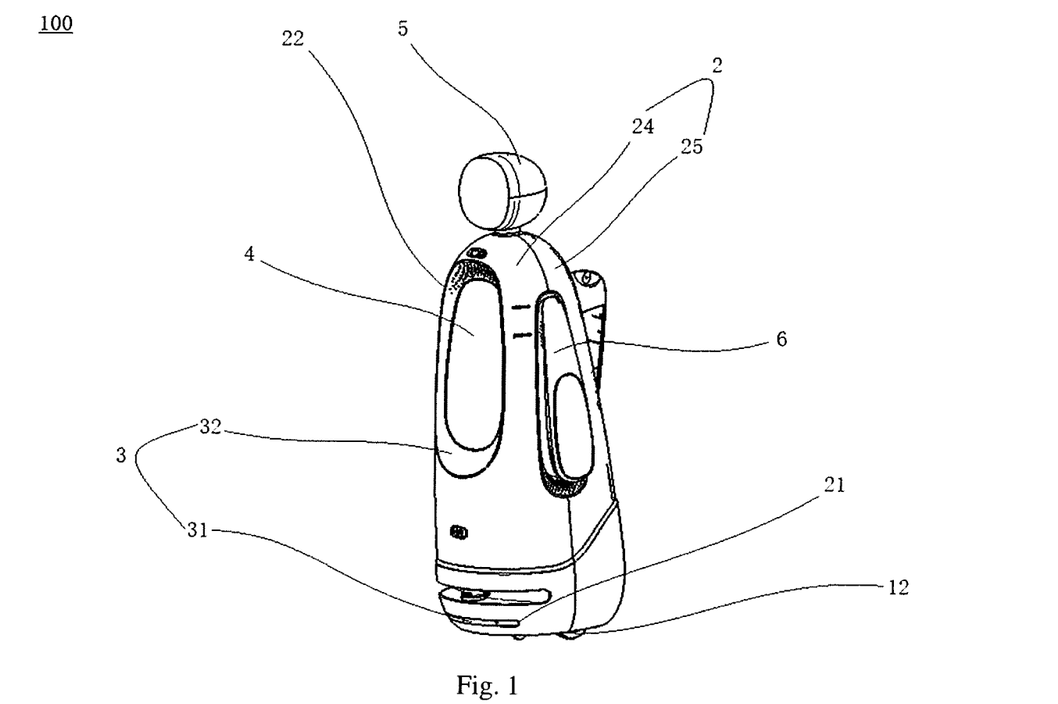
FIG. 1 is a schematic view of a service robot according to an embodiment of the present disclosure.
Figure 3:
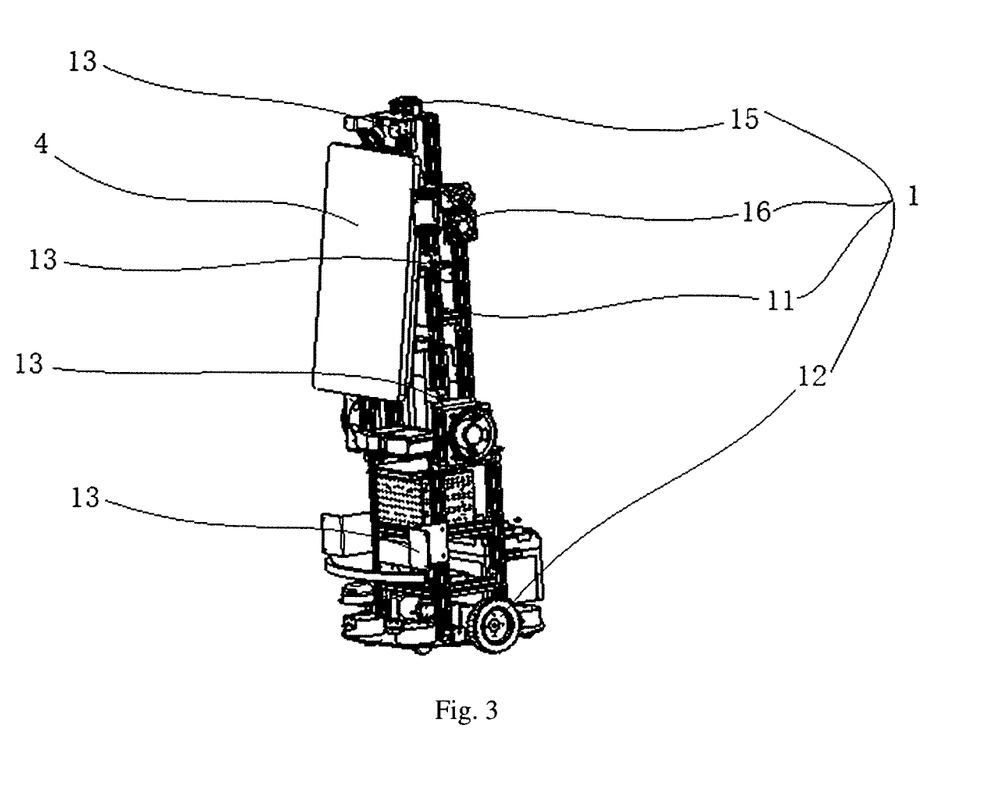
FIG. 3 is a partial schematic view of a service robot according to an embodiment of the present disclosure.

Referring to FIG. 4 and in combination with the embodiment illustrated in FIGS. 1-3, an inner wall surface of at least one of the front housing 24 and the rear housing 25 is provided with fastening studs 26 with internal threads. A plurality of fastening plates 13 configured to be connected with the fastening studs 26 extend from the robot main body 1, and the fastening plates 13 and the fastening studs 26 are configured to be fastened together by means of fastening bolts. That is, the fastening bolt is configured to pass through the fastening plate 13 to be threadedly fastened and connected with the fastening stud 26.

The fastening stud 26 is of a blind-hole structure with internal threads. After the fastening stud 26 is threadedly fastened with the fastening bolt, the fastening bolt will not penetrate the robot housing 2 to the outside and hence will not be observed by external people, thus realizing a function of concealing the fastener. As a result, not only the fastening of the robot main body 1 and the robot housing 2 can be realized, but also the fastener can be concealed to avoid diminish the aesthetics and integrity of the overall appearance of the service robot 100.

According to some embodiments of the present disclosure, the fastening studs 26 can be reasonably distributed on the inner wall of the front housing 24 and/or the rear housing 25 according to the specific structure of the robot main body 1, so as to effectively improve the connection stability of the robot main body 1 and the robot housing 2.

In combination with the embodiment illustrated in FIGS. 1-4, the robot main body 1 includes: a robot skeleton 11, a motion mechanism 12, a control mechanism and a drive mechanism. The motion mechanism 12 is arranged below the robot skeleton 11 to facilitate contact with the ground so as to realize the overall motion of the service robot 100. The drive mechanism and the control mechanism are arranged on the robot skeleton 11, and the robot skeleton 11 is used to support the drive mechanism and the control mechanism. The control mechanism may be a controller, and the drive mechanism may be a drive motor. The control mechanism is configured to control the drive mechanism to drive the motion mechanism 12 to move, such that the service robot 100 can move as a whole.

The motion mechanism 12 may be a plurality of rollers which facilitates the movement of the service robot 100.

According to some embodiments of the present disclosure, the robot housing 2 is provided with a SLAM (simultaneous localization and mapping) sensor, an obstacle avoidance sensor and a vision sensor. The SLAM sensor is used for real-time positioning and map building. The obstacle avoidance sensor and the vision sensor are used to enable the service robot 100 to avoid obstacles successfully. The above three sensors will transfer the detected information to the control mechanism, and the control mechanism can make a reasonable judgment on road condition information after receiving the signals, and then control the drive mechanism to drive the motion mechanism 12 to move reasonably, thereby achieving the obstacle avoidance movement of the service robot 100 successfully.

Referring to FIGS. 1-4, the robot main body 1 includes: a robot head driving portion 15 and a robot arm driving portion 16. The robot head driving portion 15 and the robot arm driving portion 16 may be drive motors respectively. The robot head driving portion 15 can drive a robot head 5 to rotate, and the robot arm driving portion 16 can drive a robot arm 6 to move and swing. The robot head driving portion 15 is arranged on top of the robot skeleton 11 to facilitate the connection with the robot head 5, while the robot arm driving portion 16 is arranged on both sides of the robot skeleton 11 to facilitate the connection with the robot arms 6. The robot head 5 is configured to pass through the robot housing 2 so as to be connected with the robot head driving portion 15, and the robot arm 6 is configured to pass through the robot housing 2 so as to be connected with the robot arm driving portion 16, thereby realizing the assembling of the service robot 100.

Reference throughout this specification to terms "an embodiment," "some embodiments," "an example", "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Moreover, the particular features, structures, materials, or characteristics described may be combined in any configured manner in one or more embodiments or examples. Furthermore, those skilled in the art may combine and incorporate the different embodiments or examples described in this specification.

Although embodiments of the present disclosure have been illustrated and described above, it should be understood that the above embodiments are illustrative and cannot be construed to limit the present disclosure, and that those skilled in the art may change, modify, alternate and vary the above embodiments within the scope of the present disclosure.

What is claimed is:

1. A service robot, comprising:
a robot main body;
a robot housing, the robot main body being arranged in the robot housing, and the robot housing being fixed on the robot main body by means of a fastener; and
a shielding structure being fit on the robot housing to block the fastener,
wherein the shielding structure comprises a second shielding member, the robot housing has a display through-hole, the service robot further has a front display, the front display faces directly the display through-hole, an inner wall of the display through-hole is connected with a fixed edge extending to the inside of the robot housing, the fixed edge is fastened with the robot main body by means of the fastener, and the second shielding member is fitted with the display through-hole to shield the fixed edge and the fastener.

2. The service robot according to claim 1, wherein the shielding structure comprises a first shielding member, the robot housing has a groove recessed inwardly, the fastener passes through the groove to be fastened with the robot main body, and the first shielding member is fitted with the groove to shield the fastener in the groove.

3. The service robot according to claim 2, wherein the first shielding member is fixed in the groove by snap-fitting.

4. The service robot according to claim 2, wherein after the first shielding member is fitted in the groove, an outer surface of the first shielding member is flush with an outer surface of the robot main body.

5. The service robot according to claim 2, wherein the groove is a long groove and allows a plurality of fasteners to pass and be fastened at the same time, the first shielding member has a long strip structure, and the first shielding member of the long strip structure is closely fitted with the long groove to shield the fasteners in the long groove.

6. The service robot according to claim 2, wherein the robot housing comprises a front housing and a rear housing, one of the front housing and the rear housing has a snap, while the other one thereof has a snap slot, and when the snap is fitted in the snap slot, the front housing and the rear housing are fixed together.

7. The service robot according to claim 6, wherein each of the front housing and the rear housing is provided with the groove recessed inwardly.

8. The service robot according to claim 7, wherein the rear housing comprises a rear upper housing and a rear lower housing, the groove of the rear housing is formed in the rear lower housing, and the fastener passes through the groove to be fastened with a base of the robot main body.

9. The service robot according to claim 6, wherein an inner wall surface of at least one of the front housing and the rear housing is provided with fastening studs with internal threads, a plurality of fastening plates extend from the robot main body, and the fastening studs and the fastening plates are fastened together by means of fastening bolts.

10. The service robot according to claim 9, wherein the fastening stud is of a blind-hole structure with internal threads.

11. The service robot according to claim 1, wherein the second shielding member is snap-fitted with the display through-hole.

12. The service robot according to claim 1, wherein the second shielding member has an annular structure to avoid shielding the front display.

13. The service robot according to claim 1, wherein the shielding structure has the same color as the robot housing, and the shielding structure is a flexible structure.

14. The service robot according to claim 1, wherein the robot main body comprises a robot skeleton, a motion mechanism, a control mechanism and a drive mechanism, the motion mechanism is arranged below the robot skeleton, the drive mechanism and the control mechanism are arranged on the robot skeleton, and the control mechanism controls the drive mechanism to drive the motion mechanism to move.

15. The service robot according to claim 14, wherein the motion mechanism comprises a plurality of rollers.

16. The service robot according to claim 1, wherein the robot housing is provided with a SLAM sensor, an obstacle avoidance sensor and a vision sensor.

17. The service robot according to claim 1, wherein the robot main body comprises a robot head driving portion and a robot arm driving portion, the robot head driving portion is arranged on top of the robot skeleton, the robot arm driving portion is arranged on both sides of the robot skeleton, the robot head passes through the robot housing so as to be connected with the robot head driving portion, and the robot arm passes through the robot housing so as to be connected with the robot arm driving portion.

* * * * *